July 6, 1926.
T. H. SMITH
1,591,570
ADVERTISING METHOD AND APPARATUS
Filed Dec. 5, 1925
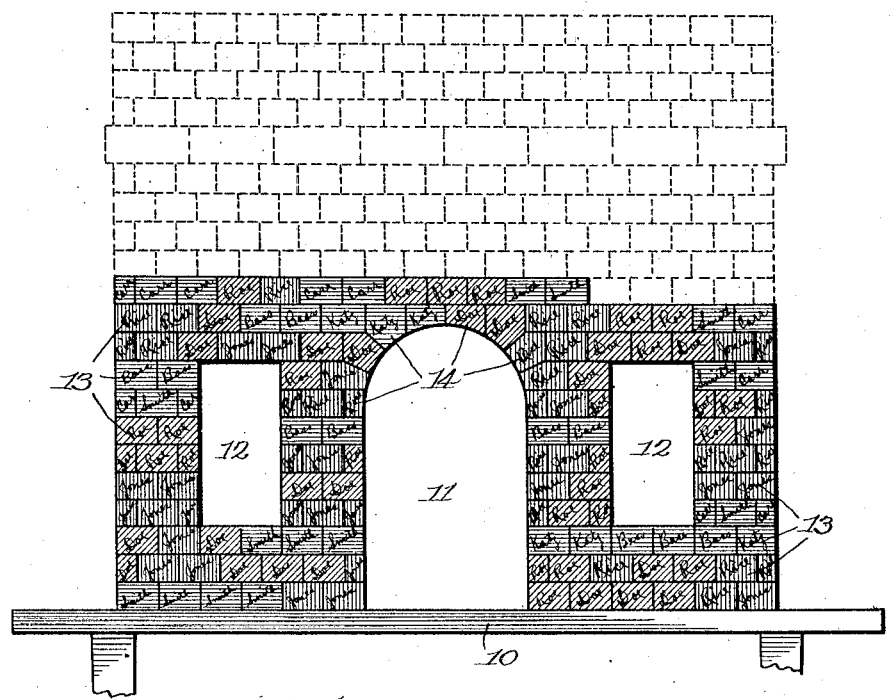
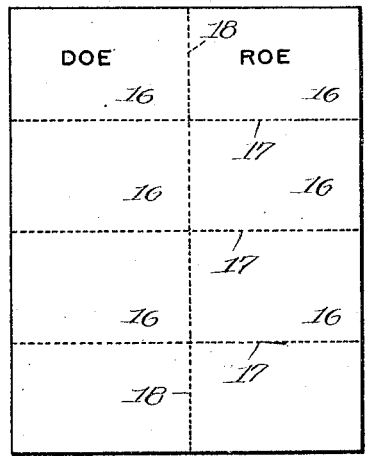
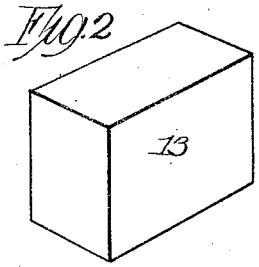
Inventor:
Thomas Harris Smith
By Gillson, Mann & Cox,
Atty's.

Patented July 6, 1926. 1,591,570

UNITED STATES PATENT OFFICE.

THOMAS HARRIS SMITH, OF CHICAGO, ILLINOIS.

ADVERTISING METHOD AND APPARATUS.

Application filed December 5, 1925. Serial No. 73,387.

The object of this invention is to stimulate interest and activity in campaigns, drives, contests and the like for the promotion of projects by giving a continuous visible representation of progress toward the desired end growing in unison with the progress and indicating the actual and relative accomplishment or contribution of each individual or group of individuals, or both, engaged therein.

The invention contemplates means for building, fabricating, or erecting in unison with the progress made of a symbolic representation of the consummation sought with structural units or elements representing suitable units, or multiples of units, by which the end in view is approached, and having each such structural unit or element continuously display an indication of accomplishments, contributions, sales, collections, orders, or the like, performed, made, taken or solicited by individuals, and when desirable the group, sub-group, team, or other division of the organization to which the individuals belong whereby not only the collective progress is shown in physical form, calculated to attract and hold attention, but the individual or divisional attainments, or both, are so clearly reflected in the progress shown as to appeal to personal pride in achievement, promote individual and team work, foster healthy competition and by attracting attention of the observing public, advertise and excite interest and co-operation in the enterprise.

For example, in a drive for funds to establish or extend a public or private institution, the whole accomplishment may be represented by a symbolic structure or a model of a building, or edifice, in which the institution is to be centralized or housed, and each unit, or group of units of accomplishment may be represented by individual, or collective structural units capable of being assembled, or fabricated, or set up, in unison with the progress of the drive, and visibly indicating the state of such progress and the amount of the progress made by groups and by individuals of those groups.

The symbolic, or representative units may be blocks of uniform size or forms, or of different sizes and forms, or different colors or materials, to indicate different degrees or numbers of units of accomplishment. Each structural unit may indicate by color a group of contestants and by shade a sub-group of contestants, and by signature, or other mark, the individuals of the groups and sub-groups by whom the particular corresponding units of progress or accomplishment are made.

The possible embodiments are numerous and various, but the gist of the invention is a physical representation indicating the state of progress toward the desired end and the individual contributions of separate workers by visible means.

The accompanying drawing shows one embodiment of the invention particularly suited for projects associated with a building.

Fig. 1 shows a table on which is a partial representation of the front of a bank building indicated in solid lines, the remainder of the structure being indicated in dotted lines;

Fig. 2 is a perspective view of one of the structural units, and

Fig. 3 is a plan view of a sheet of paper adapted to receive certain indicating marks and to be applied to the structural units.

The table is indicated at 10 and supports a representation of a wall having a door 11 and windows 12. The wall is composed of a plurality of structural units, many of which are of the same size and form as indicated at 13, and some of which are of different forms to finish courses or enter into the construction of an arch, as indicated at 14. These units may be very readily manufactured in the form of paper boxes or wooden blocks, and the like, and, of course, will take form and size according to the nature of the representation to be erected.

In this particular illustration provision is made for three groups, or teams, of workers, one group being indicated by the color red, another by the color blue, and the third by the color brown. Each block, or structural unit will show one of those colors, and in addition, some other visible indication of the individual member of the group responsible for the particular unit of accomplishment.

A very convenient way of providing these indications is suggested in Fig. 3, which shows a sheet of paper perforated to permit a ready separation into pieces corresponding to the side or end dimensions of the units. Such sheets in the illustrative embodiment would be in the three colors corresponding to the three groups. When a group reported, the person in charge would select the appropriate sheet and write upon the separate pieces 16 thereof, the names of those reporting the units of accomplishment to be entered or recorded. The strip would then be torn along the perforated lines 17 and 18, and the small pieces pasted to units and the units added to the structure. Sheets of paper of the proper color gummed on the back could be readily secured at small cost and in this way the group and individual indication can be readily applied to stock blocks, or other structural units. When a unit of irregular shape is to be placed on the structure, the strip of colored paper with the worker's name thereon can be readily trimmed to correspond to an elevation of the unit.

Suitable means for securing the units together can be readily supplied and will vary according to the material used and the nature of the symbolic structure to be erected.

The use of colors to indicate groups, shades of those colors to indicate sub-groups and written names, permits the corresponding credits for the units of work performed to be readily indicated, and yet clearly and conspicuously shown on the symbolic structure, but of course, a great variety of other means may be used within the limits of the invention and it is not intended that any description or illustration used in this disclosure shall be interpreted as limiting the protection afforded by the claims.

I claim as my invention:—

1. A physical representation of the accomplishments made by groups of workers comprising a symbolic building growing in unison with the progress made and composed of structural units each representing a unit of actual accomplshment and collectively representing the total progress made, each unit having means to indicate a group and the individual of the group responsible for the corresponding unit of actual accomplishment.

2. A physical representation of the accomplishments made by groups of workers comprising a symbolic building growing in unison with the progress made and composed of structural units each representing a unit of actual accomplishment and collectively representing the total progress made, each unit having a color representation indicative of a particular group and other means indicative of a particular individual in that group.

3. An article of manufacture comprising a structural unit to be assembled with others of its kind to build a symbolic building, said unit adapted to display visible means for indicating group ownership and other means for indicating individual ownership.

4. A representation of the progress towards a desired end comprising a growing building made up of structural units, each representing a unit of progress and each unit having means to visibly indicate the individual by whom the corresponding unit of progress was made.

5. In means for indicating the progress towards a desired end made by an organization composed of groups of workers, a symbolic building composed of structural units each representing actual contributory units, collectively indicating the total progress and individually indicating the separate contributions made by individual workers and also indicating the group to which the individual workers belong.

6. In means for indicating the progress made by an organization of workers toward a desired end, a symbolic building composed of structural units, each representing actual contributory units collectively indicating the total progress, and individually indicating the separate contributions made by each worker.

7. In means for indicating the progress made by an organization of workers toward a desired end, a symbolic building composed of separate structural units, groups of which present visible characteristics individual to each group of workers, and one or more units in each group presenting visible characteristics different from the others in that group and indicative of personal accomplishments by separate workers.

8. The process of indicating the progress of an organization and the separate contributions of individual workers which includes erecting a symbolic building with structural units representing the actual progress and visibly indicating on each unit the individual making the corresponding actual unit of progress.

9. The process of indicating the progress of an organization divided into groups of individual workers which includes erecting a symbolic building with structural units representing units of actual progress and visibly indicating on each unit the individual making the corresponding actual unit of progress and the group to which the individual belongs.

In testimony whereof I affix my signature.

THOMAS HARRIS SMITH.